Sept. 16, 1924.
R. J. ALTGELT
LISTER PLOW
Filed Nov. 29, 1919
1,508,912
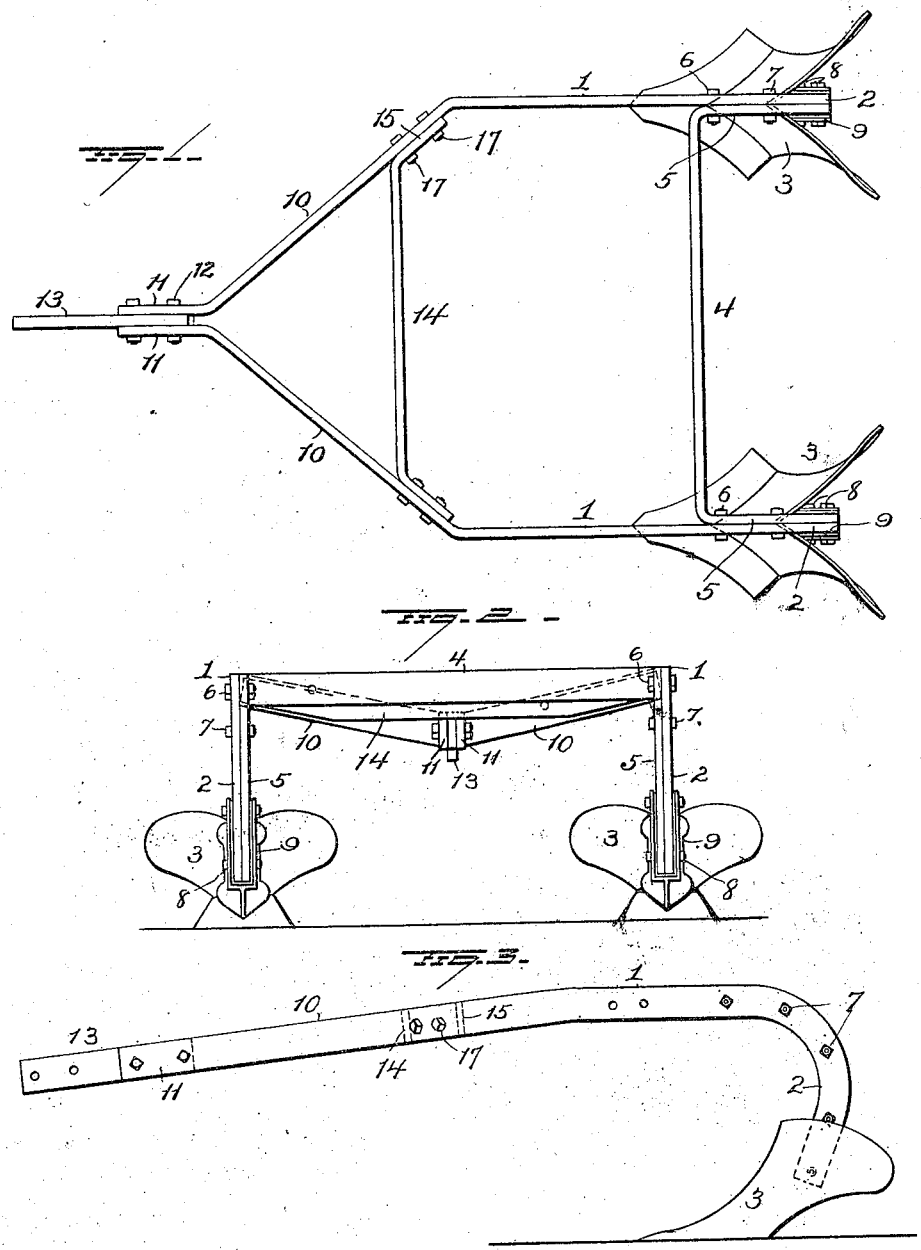
INVENTOR
R. J. Altgelt
By Seymour Bright
Attorneys Patented Sept. 16, 1924.

1,508,912

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

LISTER PLOW.

Application filed November 29, 1919. Serial No. 341,358.

*To all whom it may concern:*

Be it known that I, RUDOLPH J. ALTGELT, a citizen of the United States, and a resident of South Bend, in the county of St. Joseph and State of Indiana, have invented certain new and useful Improvements in Lister Plows; and I do hereby declare the following to be a full, clear, and exact description of the invention, such as will enable others skilled in the art to which it appertains to make and use the same.

This invention relates to improvements in plows and more particulary to frames for lister plows,—objects of the invention being to so construct the frame as to permit a close hitch to a tractor; also to permit a short turn to be made without conflict with the wheels of the tractor or with the evener of a horse hitch; to so contsruct the side bars of the frame that they shall constitute long beams with their rear ends curved downwardly to provide plow standards, and to so construct the rear cross brace that the same may be utilized to reinforce said standards.

With these and other objects in view, the invention consists in certain novel features of construction and combinations of parts as hereinafter set forth and pointed out in the claim.

In the accompanying drawings; Figure 1 is a plan view of a lister plow embodying my improvements; Figure 2 is a rear end view, and Figure 3 is a side elevation.

The lister frame comprises two side bars 1, 1, and constitute long beams, the rear ends of which are curved downwardly and provide standards 2 for the attachment of plow bases 3, the latter being, in the present instance, of the double mold-board type.

The rear portions of the side bars or beams 1 are spaced apart and braced by a cross bar or brace 4, the respective ends of which are provided with extensions 5 disposed at approximately right angles thereto and bolted to the side bars or beams, as at 6. The extensions 5 are bent to conform to the shape of the standard portions 2 of the side bars or beams 1 and lie against said standard portions preferably throughout the full length of the latter, and serve to reinforce said standard portions. Bolts 7 secure the brace extensions to the standard portions 2 of the beams, and the plow bases are secured to said standard portions and extensions by means of bolts 8 which pass through the frogs 9 of said plow bases and also through the standard portions 2 and brace extensions 5.

The forward portions of the side bars or beams 1 are made with integral diagonal extensions 10 which converge and terminate at their forward ends in parallel straight arms 11 approximately in line with the longitudinal axis of the frame. Between the parallel arms 11 of the convergent extensions of the frame, the rear end of a draw bar 13 is disposed and secured by bolts 12,— said draw bar being adapted for connection with a tractor or other draft means. The forward portion of the frame is strengthened by a transverse brace 14 located between the convergent forward extensions 10—10 and are provided at its ends with arms 15 securely fastened to said convergent portions of the frame by means of bolts 17.

My improvements are such as to permit the lister to have a close connection with the tractor or other draft means and can be turned without liablity of conflict with any portion of the same, and the sides of the frame constitute long beams terminating at their rear ends in plow standards and said standards are reinforced.

Having fully described my invention what I claim as new and desire to secure by Letters-Patent, is:—

A frame for a plow comprising two parallel beams terminating at their rear ends in standards to receive soil-engaging members, the forward portions of said beams having integral converging members provided at their forward ends with parallel extensions, a draw-bar secured between said parallel extensions, a brace secured between the forward converging portions of the beams, and a brace secured betwen the rear portions of the beams and having extensions forming re-inforcements for the standard portions of the beams.

In testimony whereof, I have signed this specification in the presence of two subscribing witnesses.

RUDOLPH J. ALTGELT.

Witnesses:
  EDWIN NICAR,
  GEORGE R. LAMPHERE.